United States Patent
Baldischweiler

(10) Patent No.: US 11,205,020 B2
(45) Date of Patent: Dec. 21, 2021

(54) MEMORY MANAGEMENT OF A SECURITY MODULE

(71) Applicant: GIESECKE+DEVRIENT MOBILE SECURITY GMBH, Munich (DE)

(72) Inventor: Michael Baldischweiler, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 206 days.

(21) Appl. No.: 16/308,121

(22) PCT Filed: May 31, 2017

(86) PCT No.: PCT/EP2017/000636
§ 371 (c)(1),
(2) Date: Dec. 7, 2018

(87) PCT Pub. No.: WO2017/211443
PCT Pub. Date: Dec. 14, 2017

(65) Prior Publication Data
US 2019/0163935 A1 May 30, 2019

(30) Foreign Application Priority Data
Jun. 10, 2016 (DE) .......................... 102016007139.7

(51) Int. Cl.
*G06F 11/30* (2006.01)
*G06F 12/14* (2006.01)
(Continued)

(52) U.S. Cl.
CPC .......... *G06F 21/79* (2013.01); *G06F 12/1408* (2013.01); *G06F 12/1441* (2013.01);
(Continued)

(58) Field of Classification Search
CPC ...... G06F 21/79; G06F 21/62; G06F 12/1408; G06F 12/1441; G06F 21/602;
(Continued)

(56) References Cited

U.S. PATENT DOCUMENTS

2004/0177215 A1* 9/2004 Nagamasa ....... G06K 19/07732
711/103
2014/0157432 A1* 6/2014 Honzumi .............. G06F 21/629
726/27
(Continued)

FOREIGN PATENT DOCUMENTS

DE 102009018222 A1 10/2010
EP 1094423 A2 * 4/2001 ........... G06Q 20/341
(Continued)

OTHER PUBLICATIONS

"Proposal For ISO/IEC 7816-12: Identification Cards—Integrated Circuit(s) Cards with Contacts—Part 12: USB Electrical Interface and Operating Procedure," ISO/IEC JTC 1/SC 17/WG 4 N 1605, Nov. 11, 2001, 4 Pages.
(Continued)

*Primary Examiner* — Amie C. Lin
(74) *Attorney, Agent, or Firm* — Workman Nydegger

(57) ABSTRACT

The present invention relates to a security module and to a corresponding method for operating the security module for realizing a secure memory management. The subject matter according to the invention takes into account existing hardware components, for example a smart card, and can thus be integrated into existing smart cards with particularly little technical effort. The secure memory management prevents attacks against memory segments of the data memory.

12 Claims, 2 Drawing Sheets

(51) Int. Cl.
*G06F 21/79* (2013.01)
*G06F 21/62* (2013.01)
*H04W 4/70* (2018.01)
*G06F 21/60* (2013.01)

(52) U.S. Cl.
CPC ............ *G06F 21/602* (2013.01); *G06F 21/62* (2013.01); *H04W 4/70* (2018.02); *G06F 2212/1052* (2013.01); *G06F 2212/202* (2013.01); *G06F 2212/402* (2013.01)

(58) Field of Classification Search
CPC ....... G06F 2212/1052; G06F 2212/202; G06F 2212/402; G06F 21/72; H04W 4/70
See application file for complete search history.

(56) References Cited

U.S. PATENT DOCUMENTS

| | | | | |
|---|---|---|---|---|
| 2015/0220455 | A1* | 8/2015 | Chen | G06F 21/64 |
| | | | | 711/163 |
| 2015/0278123 | A1* | 10/2015 | Nayshtut | G06F 21/56 |
| | | | | 711/163 |
| 2018/0027405 | A1* | 1/2018 | Holtmanns | H04W 12/0403 |
| | | | | 455/558 |

FOREIGN PATENT DOCUMENTS

| | | |
|---|---|---|
| EP | 1094423 A2 | 4/2001 |
| EP | 1770534 A1 | 4/2007 |
| KR | 20100046417 A | 5/2010 |
| KR | 20150069435 A | 6/2015 |
| WO | 2016014919 A1 | 1/2016 |

OTHER PUBLICATIONS

"Identification Cards—Integrated Circuit(s) Cards with Contacts—Part 1: Physical Characteristics Amendment 1: Maximum Height of the IC Contact Surface," ISO/IEC 7816-1: 1998 / Amd.1, 1998, 2 Pages.
"Identification Cards—Integrated Circuit(s) Cards with Contacts—Part 2: Dimensions and Locations of the Contacts Amendment 1: Assignment of Contacts C4 and C8," ISO/IEC 7816-2:2002/FPDAM 1, Jul. 31, 2002, 8 Pages.
"Identification Cards—Integrated Circuit(s) Cards with Contacts—Part 3: Electronic Signals and Transmission Protocols Amendment 1: Electrical Characteristics and Class Indication for Integrated Circuit(s) Cards Operating at 5 V, 3 V, and 1,8 V," ISO/IEC 7816-3:2001/FDAM 1: 2001 (E), Sep. 28, 2001, 10 Pages.
"Information Technology—Identification Cards—Integrated Circuit(s) Cards with Contacts—Part 3: Electronic Signals and Transmission Protocols," ISO/IEC CD 7816-3, Apr. 1, 2003, 56 Pages.
"Information Technology—Identification Cards—Integrated Circuit(s) Cards with Contacts—Part 3: Electronic Signals and Transmission Protocols," ISO/IEC 7816-3, Second Edition, Sep. 18, 1997, 31 Pages.
"Proposed Amendment for ISO/IEC 7816-3: 1997 USB Interface for ICCs with Contacts," ISO/IEC 7816, Sep. 14, 2001, 5 Pages.
"Information Technology—Identification Cards—Integrated Circuit(s) Cards with Contacts—Part 3: Electronic Signals and Transmission Protocols Amendment 2: Structures and Transmission of APDU Messages," ISO/IEC 7816-3: 1997/PDAM-2, Jan. 4, 2002, 16 Pages.
"Information Technology—Identification Cards—Integrated Circuit(s) Cards with Contacts—Part 4: Interindustry Commands for Interchange Amendment 1: Impact of Secure Messaging on the Structures of APDU Messages," ISO/IEC 7816-4, Aug. 25, 1997, 9 Pages.
"Identification Cards—Integrated Circuit(s) Cards—Part 4: Organization, Security and Commands for Interchange," ISO/IEC FCD 7816-4.2, Sep. 26, 2003, 89 Pages.
"Identification Cards—Integrated Circuit(s) Cards with Contacts—Part 5: Numbering System and Registration Procedure for Application Identifiers," ISO/IEC 7816-5, Jun. 15, 1994, 12 Pages.
"Identification Cards—Integrated Circuit(s) Cards with Contacts—Part 6: Interindustry Data Elements Amendment 1: IC Manufacturer Registration," ISO/IEC F-P/DAM 7816-6, 1998, 8 Pages.
"Identification Cards—Integrated Circuit Cards with Contacts—Part 6: Interindustry Data Elements for Interchange," ISO/IEC FDIS 7816-6: 2003 (E), Jul. 18, 2003, 26 Pages.
"Information Technology—Identification Cards—Integrated Circuit(s) Cards with Contacts—Part 7: Interindustry Commands for Structured Card Query Language (SCQL)," ISO/IEC 7816-7, Feb. 1, 1997, 29 Pages.
"Identification Cards—Integrated Circuit(s) Cards with Contacts—Part 8: Security Related Interindustry Commands," ISO/IEC FDIS 7816-8: Jun. 25, 1998, 33 Pages.
"Identification Cards—Integrated Circuit Cards—Part 8: Commands for Security Operations," ISO/IEC FDIS 7816-8: 2003 (E), Jul. 21, 2003, 23 Pages.
"Report of Changes to FDIS 7816-8," ISO/IEC 7816-8, Oct. 19, 1998, 4 Pages.
"Information Technology—Identification Cards—Integrated Circuit(s) Cards with Contacts—Part 9: Interindustry Commands for Card and File Management," ISO/IEC FCD 7816-9, Jan. 17, 2003, 15 Pages.
"Identification Cards—Integrated Circuit(s) Cards with Contacts—Part 9: Additional Interindustry Commands and Security Attributes," ISO/IEC FDIS 7816-9, Nov. 8, 1999, 34 Pages.
"Identification Cards—Integrated Circuit Cards with Contacts—Part 9: Commands for Card and File Management," ISO/IEC FDIS 7816-9: 20003 (E), Jul. 21, 2003, 17 Pages.
"Information Technology—Identification Cards—Integrated Circuit(s) Cards with Contacts—Part 11: Personal Verification Through Biometric Methods," ISO/IEC FCD 7816-11, Jul. 15, 2002, 36 Pages.
"Information Technology—Identification Cards—Integrated Circuit(s) Cards with Contacts—Part 13: Registration of Integrated Circuit Manufacturers," ISO/IEC CD 7816-13, Jan. 4, 2002, 7 Pages.
"Information Technology—Identification Cards—Integrated Circuit(s) Cards with Contacts—Part 15: Cryptographic Information Application," ISO/IEC FDIS 7816-15: 2003 (E), Feb. 12, 2003, 77 Pages.
German Search Report from DE Application No. 102016007139.7, dated May 12, 2017.
International Search Report from PCT Application No. PCT/EP2017/000636, dated Sep. 1, 2017.

* cited by examiner

MEMORY MANAGEMENT OF A SECURITY MODULE

BACKGROUND

The present invention relates to a security module having a secure memory management which permits that so-called roll-backs or certain attacks on secure memory areas are not possible. The present invention also relates to a method aimed thereat for operating the security module and in particular for making available a secure memory management. The invention is further aimed at a corresponding computer program product with control commands for executing the proposed method and/or operating the proposed security module.

According to known methods, security modules in the form of chip cards having hardware devices, such as, for example, a processor unit, also referred to as smart card, microprocessor chip card or processor card, are used in many security-critical areas. In this regard, application scenarios are known such as, for example, the use of chip cards as identification documents, for proving the access authorization of a subscriber, for example to a mobile communication network, or for carrying out payment transactions. The use of chip cards often takes place in interaction with a terminal device provided for the respective application and having a reading unit, which is adapted to read out security-critical data from such a chip card after a prior authentication. In particular, chip cards are known in this regard which are exchangeably introduced into a mobile telephone or are permanently integrated therein.

When security-critical applications are carried out by a security module, for example a chip card or an eUICC, a protection of the security module and of the security-critical data deposited therein is necessary against attacks and unauthorized manipulations. In this regard, attack techniques are known together with corresponding defense measures.

One attack scenario on a SIM card of a mobile telephone, whether an exchangeable SIM card or a permanently integrated SIM card, thus a UICC or an eUICC, is the reading out of memory information from the corresponding data memory and loading the read data again optionally after several write operations on the data memory. For example, in a first step, a credit can be loaded onto the UICC and, in a second step, a so-called MMU is changed and a backup is created of the memory. In a subsequent third method step, a value can be subtracted from the credit, whereupon the backup is now loaded back again in a manipulative step. Thus, the debiting operations of the credit are reversed again and a manipulation of the card credit has thus taken place.

SUMMARY

Accordingly, it is an object of the present invention to make available a security module and a method for operating a security module, which allows to not permit data manipulations or at least to detect data manipulations. This solution is to be implemented as far as possible employing existing hardware systems with minimal technical effort. It is further an object of the present invention to make available a corresponding computer program product with instructions for executing the method.

Accordingly, a security module is proposed having a secure memory management. The security module comprises a data memory and at least two write units, which are each adapted to cause write operations on the data memory. Further, a detection unit is provided, which is adapted to detect the write unit that causes the write operation. The security module further comprises a manipulation handling unit adapted to trigger a security operation made available, if the causing of the write operation is to be associated with an unauthorized write unit.

The average person skilled in the art knows various application scenarios of the implementation of the memory management in concrete terms. Thus, for example, it is possible for the security module itself to have a data memory, or else for the security module to share the data memory with further components. For example, the security module could be present in the form of an eUICC, which shares a data memory, for example a RAM memory, with a baseband controller BB.

Thus, while data memories are arranged in a security module, the security module has further components, which optionally share the data memory among each other. These components can be referred to as write units, for example, which each have access to the data memory. In this case, it must be ensured that the write units, among one another, can read out or write only those memory segments that are associated with said write units. Thus, it has to be prevented that, for example through a gap in an operating system, a first write unit receives read and/or write access to memory segments of another write unit. If this is not successful due to an attack or a security gap, it has to be prevented at least that a write operation to the data carrier can take place subsequent to a read operation. This has the consequence that a writing back of read data, a so-called roll-back, is not possible. It is particularly advantageous to prevent such a writing back, or at least, if this can be realized more easily technically, to detect a writing back of data.

This is achieved according to the invention by providing a detection unit that is adapted to analyze write operations on the data memory and to detect which one of the write units accesses the data memory. This can take place in such a manner that, for example, the detection unit is adapted to detect data streams on the data memory or to the data memories, to trace these back and to thus identify a write unit.

The average person skilled in the art knows further possibilities of detecting a write unit. In particular, further components can be involved that permit a conclusion as to a write unit. A write unit is to be understood to mean that said write unit does not necessarily have to carry out the physical write operation, but at least initiates or causes such a write operation. A memory unit can thus be understood as any unit requesting read and/or write access to a data memory. A delete operation in particular is likewise considered to represent a write operation, since it overwrites certain data. Thus, according to the invention, it is particularly advantageous that also an unauthorized deletion of data on the security module is detected and/or prevented.

When it is now detected that a write unit that is not authorized to read or write on a data carrier, the manipulation handling unit reacts accordingly. For this purpose, it is possible according to the invention for the manipulation handling unit to detect a write operation that has not been approved, and to prevent said write operation in advance. Further, however, it is also possible that it is detected only after an execution of the write operation that the write operation has not been approved. It is thus possible to react in such a manner that the write operation is reversed, for example by loading the data from before the write operation into the data memory again after an execution of the write operation. However, it can also be possible that the non-approved write information has already been carried out and thus merely information has to be made available that indicates that a manipulation, i.e. a non-approved write operation, has been carried out. The manipulation handling unit can have a data memory, for example, which provides information about which write units are admitted for which memory segments. However, it is also possible according to the invention that a corresponding authentication of the individual write units takes place in such a manner that the manipulation handling unit can automatically detect whether or not the respective write unit may have access. To this end, various possibilities are known to the person skilled in the art of how he can cause an authentication or an authorization. Further, the corresponding units also have a decision logic that permits selecting which security operations are to be executed.

This can be permanently preset, i.e. hard-wired, or else can also be dynamically read out from a further data memory.

The security module can be present, for example, in the form of a chip card, an embedded UICC (eUICC), secure element SE, or an integrated UICC (iUICC). However, the person skilled in the art also knows further hardware components which can form such a security module. According to the invention, a write unit can be referred to as such a security module or as a part of such a security module. A further write unit can be, for example, a so-called baseband controller or baseband processor. Such baseband processors are embedded in systems, such as, for example, mobile telephones, GPS or Bluetooth devices. These typically assume functions of data transmission via a communication interface. Such a write unit can be, for example, a conventional baseband processor. According to the invention, chip card operating systems installed on such a security module are used as well. These make available a software for securing the storage of secret data on memories. These can be, for example, non-volatile memories, so-called NVM memories. Further, prepaid methods are used on a memory card that writes and/or reads sensitive data.

According to the invention, it is particularly advantageous that a so-called charge pump is used. Said charge pump is responsible for deleting/writing the so-called NVM memory. The charge pump is in a position to delete either the entire NVM memory or a single physical sector (16 Bytes-64 kBytes, depending on the size of the NVM memory). In this case, the address is communicated to the charge pump, logically or physically. Via a so-called memory management unit MMU, the respective page is selected and then written or deleted. The address selection can take place either physically or logically; this may have to be implemented differently in dependence on the manufacturer.

In the course of the ever further migration of systems, the chip card (UICC) or the security element SE is more and more becoming a component of other systems. Thus, for example, a baseband controller can also serve as a master for a UICC or eUICC. The UICC or eUICC is activated via the classical ISO 7816 protocols, wherein the corresponding data transmission protocols can define byte-oriented protocols T=0 or block-oriented protocols T=1. In particular, it is advantageous that at least one standard from the ISO 7816 family is used with regard to the method according to the invention or the security module according to the invention.

The data are deposited on the UICC or eUICC in an extra memory area that cannot be addressed from the outside. The data are present on the NVM in encrypted form. The address/data encryption takes place in an independent component of the UICC or eUICC controller. An extra key is provided for each controller. Thus, the data cannot be exchanged between the individual UICCs or eUICCs, even though this would be physically possible. Since, however, the UICC is only a component of another controller, e.g. a baseband controller, the UICC shares the RAM memory, thus also the NVM memory, with the baseband controller. The physical separation of the memories takes place via an MMU. The MMU can be controlled by means of different mechanisms, in order to ensure that the baseband controller receives no access to the memory of the iUICC. In order to ensure that the data of the memories of the iUICC cannot be employed, these are likewise protected with the aid of the address/data encryption against attacks, such as phishing. Even if the attacker can read out the data from the memories, they are typically of no use to him. If, however, the attacker is in a position to access the data making use of any weaknesses, for example, of the operating system of the hardware or the like, it must be ensured at least that it is not possible to be able to load the data back again into the data memory via this channel. According to the invention, the attack can be prevented by loading a backup into the memory.

Since the NVM memory has a charge pump and said charge pump is responsible for deleting and/or writing the NVM, there is the possibility of physically detecting a change in the memory. If an NVM change is not effected via the iUICC, additional information is set upon the deleting/writing. This can mean, for example, the deletion of the key for the address/data encryption or certain flags are set in the NVM that show to the iUICC that an NVM manipulation has been effected from the outside. The iUICC now has the possibility of deciding on the basis of corresponding logics whether or not this NVM change has been permissible. Thus, according to the invention, it is possible to prevent targeted roll-backs from the NVM memory in the area of the iUICC.

The memory can be, for example, a so-called EEPROM memory having multiple pages. The charge pump in the UICC has the possibility of setting an additional flag in the EEPROM page or FLASH page. This flag is deleted whenever a deletion process takes place on this page, independently of whether this is done from the outside or via the charge pump of the UICC. It is thus possible to ensure that the areas that have this flag have really been written by the UICC. A writing of other information from the outside, which is possible via the shared FLASH/EEPROM with the aid of the MMU, is thus prevented. Thus, the setting of an additional flag takes place if the writing was not effected by means of the charge pump as a possible write unit.

Thus, it is also possible that the memory management unit is present only as a means for the purpose of memory division. The MMU itself typically does not have any possibility to distinguish these areas. According to the invention, it is thus possible to ensure that security-relevant data can be written only by the UICC, i.e. by a specific write unit. In this case, it does typically not play a role that the data themselves are present in the FLASH in encrypted form, even if the encryption takes place in the chip individually. A so-called charge pump can be, for example, a charge pump as already known to the person skilled in the art. According to the invention, it is thus possible to re-use existing hardware components, or to adjust them only minimally, in order nevertheless to achieve a secure data management.

According to one aspect of the present invention, the security module is present in the form of a chip card, a chip card module, a SIM card, an M2M module or an eUICC. This has the advantage that the proposed security module can be embedded in the hardware of existing systems with only slight adjustments. In particular, existing components can be re-used.

According to a further aspect of the present invention, the data memory is manageable by means of a memory management unit, MMU. This has the advantage that no new hardware components have to be added and existing hardware can again be made further use of.

According to a further aspect of the present invention, the data memory is at least partially secured by means of address and/or data encryption. This has the advantage that further security features can be introduced into the proposed system and/or the proposed security module. Thus, it is generally an advantage of the present invention that known security mechanisms can be used further in a seamless manner. This is ensured in particular by the proposed measures not contradicting any existing security mechanisms.

According to a further aspect of the present invention, the security module supplies at least one sensor that permits the physical detection of a write unit by means of at least one measurement. This has the advantage that, for example, currents can be measured within a chip card that give an indication as to from which component a write operation has been requested or triggered. This permits a very secure diagnosis of an origin of a write operation that is hardly susceptible to errors.

According to a further aspect of the present invention, the security operation is present in the form of at least one operation from a group, said group comprising:

A write operation of a flag, a write operation of a locking function of the data memory, a write operation of a manipulation information item, a delete operation, a rejection of the write operation and a reversal of the write operation. This has the advantage that one or several of the proposed security operations can be executed, as soon as a manipulation of the data memory is detected. Thus, for example, a security operation can be triggered which sets a predetermined flag, thus a bit, if a manipulation has been discovered. It is thus stored that the deposited data are no longer trustworthy and further components can then act accordingly in further method steps. Thus, for example, it can be implemented that further components no longer access this memory area, or that the memory area is checked for the correctness of the stored data. If this is possible, thus, the manipulation can be rectified in such a manner that the correct data are written back again over the manipulated data.

Typically, however, there is no information as to how the correct data must actually read, so that according to the invention a data memory can remain as it is, but is no longer activated by further components. It is particularly advantageous, however, to detect the manipulation in advance in accordance with the invention, i.e. before the write operations are executed. In this case, it is also possible to not permit the manipulative write operations from the start and to only grant access to that write unit which has corresponding rights. Thus, according to the invention, a manipulation of the data in a certain memory area is prevented.

According to a further aspect of the present invention, the security module supplies a decision logic that describes which security operation is to be triggered. This has the advantage that, for example, the simplest possible logic can be made available, in such a manner that there is only one possibility for selecting a security operation. A corresponding decision logic is thus omitted, which, however, can advantageously be expanded to the extent that a plurality of selection options are supplied, which permit reacting accordingly in each situation or in dependence on the detected manipulation. Thus, according to the invention, a table can be supplied, which describes which security option or operation is to be executed with reference to which manipulation. This can take place, for example, in dependence on a detected write unit, in such a manner that certain components, i.e. write units, are classified as trustworthy and further components, i.e. write units, are classified as non-trustworthy. Thus, it is possible to detect manipulations by known components merely as errors, whereas manipulations by other components can be detected as malicious. The security operation has to be selected accordingly then.

According to a further aspect of the present invention, the manipulation handling unit is adapted to trigger the security operations before or after a write operation. This has the advantage that malicious write operations can be avoided in advance, or else that write operations can subsequently be marked as malicious and can optionally be reversed.

According to a further aspect of the present invention, the activation of the security module takes place by means of a standard of the ISO 7816 family. This has the advantage that interoperability of the proposed security module and/or of the proposed method for operating the security module with other systems is ensured.

According to a further aspect of the present invention, the data memory is present in the form of a non-volatile memory. This has the advantage that existing security-critical data can be stored persistently. However, the present invention is in no way restricted only to a non-volatile memory, but relates to volatile memories as well.

According to a further aspect of the present invention, at least one write unit is present in the form of an eUICC. Further, at least one write unit is present in the form of a baseband controller BB. This has the advantage that components of a smart card can share a memory with further components, and thus merely minor hardware resources have to be made available. Typically, each component receives access rights to a part of the data memory made available, as a result of which also a security-critical exceeding of these rights can occur in exceptional cases. According to the invention, a method is made available which indicates or prevents such an exceeding of memory access rights.

According to a further aspect of the present invention, the detection of the write unit by the manipulation handling unit takes place employing a charge pump. This has the advantage that the charge pump represents a suitable means for clearly detecting which write unit has caused a certain write operation.

According to a further aspect of the present invention, the data memory is arranged within an eUICC or outside of an eUICC. This has the advantage that the memory module can be present per se in the form of an eUICC, but also that an eUICC can be present as part of another component. Thus, such a component, i.e. an eUICC, can be a component of another controller, for example of a baseband controller.

The object is likewise achieved by a method for secure memory management, wherein the method has the steps of physically measuring a write operation on a data memory employing a charge pump as well as selecting a security operation made available in dependence on the readout, on the basis of a logic made available.

The invention further relates to a computer program and/or computer program product comprising control commands which, if they are executed on a computer, implement the proposed method and/or cause an operation of the proposed security module.

In this case, it is particularly advantageous that the method is suitable for operating the security module and the security module makes available structural features that permit an execution of the method for secure memory management. Thus, all features disclosed with reference to the security module can also be applied to the correspondingly proposed method. Vice-versa, all features specified in the light of the method can also be applied to the security module. The same applies to the configuration of the computer program product.

BRIEF DESCRIPTION OF THE DRAWINGS

In the following, advantageous embodiments are described with reference to the attached figures. There are shown.

DETAILED DESCRIPTION OF VARIOUS EMBODIMENTS

Figure 1:
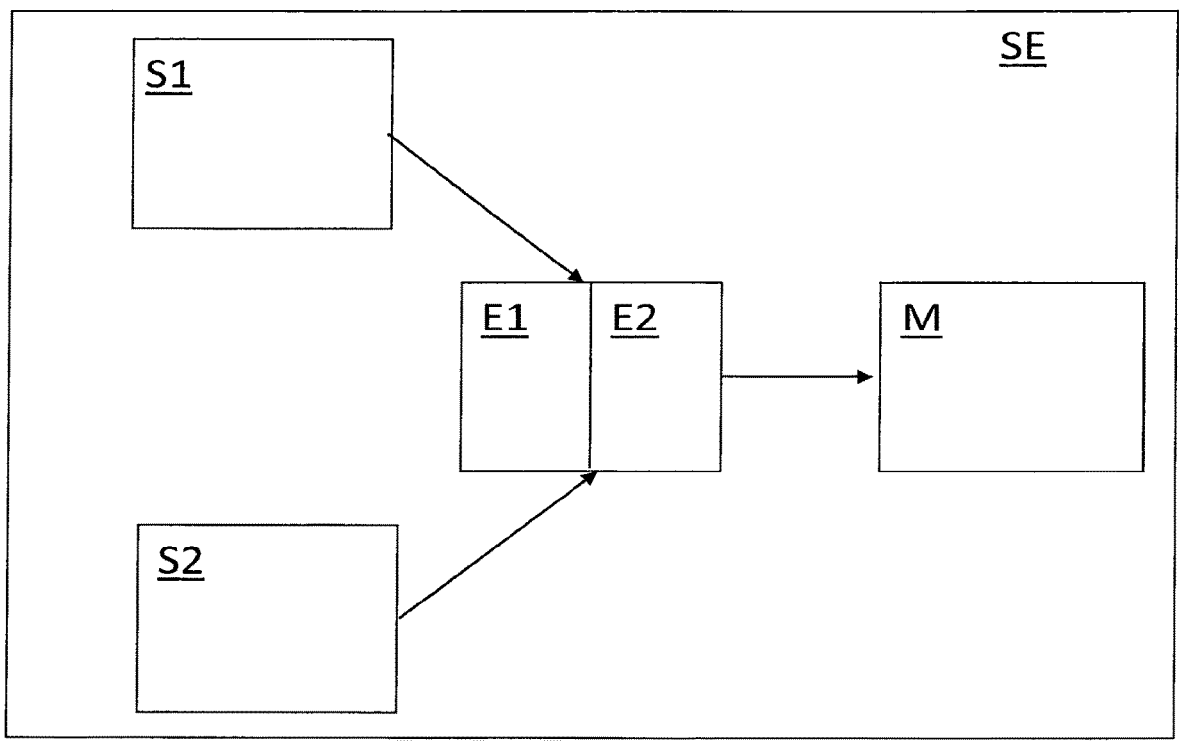
FIG. 1: a schematic block diagram of the security module according to one aspect of the present invention.

The present FIG. 1 shows a security module SE, i.e. a security element, which has memory-card typical components. The present FIG. 1 is limited to the features that are substantial for the invention. This is intended merely to contribute to a simple understanding and is in no way to be understood in such a manner that no further components are installed in the proposed security module SE. The average person skilled in the art recognizes the typical components installed in chip cards and integrates these accordingly.

In the present case, two write units S1, S2 are depicted, which access a data memory M. The two write units S1, S2 need not access the data memory M directly in this case, but can merely cause a write operation. These two write units can be, for example, an iUICC or a baseband controller. Since these two components share the same memory M, it is possible, on the basis of an utilization of a gap in the hardware or in the operating system of the chip card, that a component accesses a memory area for which said component has no rights. The two components E1, E2 are provided for this reason. These are the detection unit E1 and the manipulation handling unit E2. In the present FIG. 1, these two components are depicted as a single component. This again represents only one aspect of the present invention, and is not to belie that these two units can also be present separately. For example, one of these two units E1, E2 can be present in the form of a charge pump. For example, the charge pump can make available at least part of the detection unit E1, since, in dependence on the charge pump, it can be identified which write unit S1, S2 accesses the data memory M.

When a manipulation is detected now, it is possible that the access of one of the two write units S1, S2 is prevented or the write operation is reversed subsequently.

A corresponding logic for security operations and information for making a decision can be stored in the data memory M, for example, wherein a separate, further data memory is also possible. In one of the data memories made available, a flag or a bit can be set, for example, which indicates that a manipulation has occurred. However, it is also possible to deposit a corresponding locking flag which excludes access to the already manipulated data by further components.

In general, the arrows in the present FIG. 1 describe a flow of signals or flows within the security module. However, these are in turn only to be understood schematically and typically also take place in the correspondingly reverse direction. The present arrows are formed unidirectionally merely in order to illustrate the write operations of the write units S1, S2.

Figure 2:
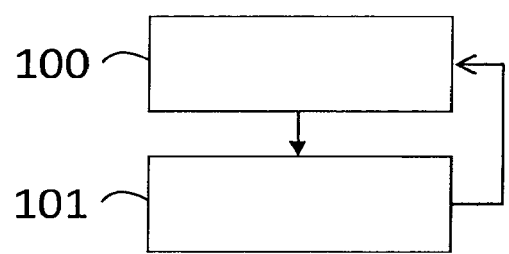
FIG. 2: a schematic representation of a flow chart of a method for operating the proposed security module according to one aspect of the present invention.

FIG. 2 shows a method for secure memory management, for example in a security module. The method steps of a physical measuring 100 of a write operation on a data memory employing a charge pump are provided for this purpose. Further, a selection 101 of a security operation made available takes place in dependence on the read-out, on the basis of a logic made available. The method made available can be stored, for example, by means of control commands, which are fed to the security module via a further memory, as shown for example in FIG. 1. This can be the memory M as shown in FIG. 1. However, a further, separate memory can also be provided.

Thus, a security module and a corresponding method for operating the security module for the realization of a secure memory management have been proposed. The object according to the invention allows preventing and/or marking attacks against data memories and/or unauthorized write or delete operations to a data memory. In particular, it is particularly advantageous according to the invention that so-called roll-back attacks can be avoided.

The invention claimed is:

1. A security module with secure memory management, comprising:
 a data memory and at least two write units that are each adapted to cause write operations on the data memory;
 a detection unit adapted to detect a specific write unit of the at least two write units that causes a specific write operation on the data memory; and
 a manipulation handling unit adapted to trigger a security operation made available in response to the specific write operation being associated with a non-authorized write unit;
 wherein the security module supplies at least one sensor employing a charge pump that permits a physical detection of the specific write unit that causes the specific write operation using at least one physical measurement of an electric current.

2. The security module according to claim 1, wherein the security module is present in a form of a chip card, a chip card module, a subscriber identity module (SIM) card, a machine-to-machine (M2M) module or an embedded universal integrated circuit card (eUICC).

3. The security module according to claim 1, wherein the data memory is manageable by a memory management unit (MMU).

4. The security module according to claim 1, wherein the data memory is at least partially secured by address and/or data encryption.

5. The security module according to claim 1, wherein the security operation is present in a form of at least one operation from a group, the group comprising:
 a write operation of a flag,
 a write operation of a locking function of the data memory,
 a write operation of a manipulation information item,
 a delete operation,
 a rejection of the specific write operation and
 a reversal of the specific write operation.

6. The security module according to claim 1, wherein the security module supplies a decision logic that describes which security operation is to be triggered.

7. The security module according to claim 1, wherein the manipulation handling unit is adapted to trigger the security operation before or after a write operation.

8. The security module according to claim 1, wherein activation of the security module takes place by a standard of International Organization for Standardization (ISO) 7816 family.

9. The security module according to claim 1, wherein the data memory is present in a form of a non-volatile memory.

10. The security module according to claim 1, wherein at least one write unit is present in a form of an eUICC and/or at least one write unit is present in a form of a baseband controller.

11. The security module according to claim 1, wherein detection of the write unit by the manipulation handling unit takes place employing a charge pump.

12. The security module according to claim 1, wherein the data memory is arranged within an eUICC or outside an eUICC.

* * * * *